Nov. 9, 1954  D. W. KELBEL ET AL  2,693,711
TRANSMISSION
Filed Jan. 19, 1950  2 Sheets-Sheet 1
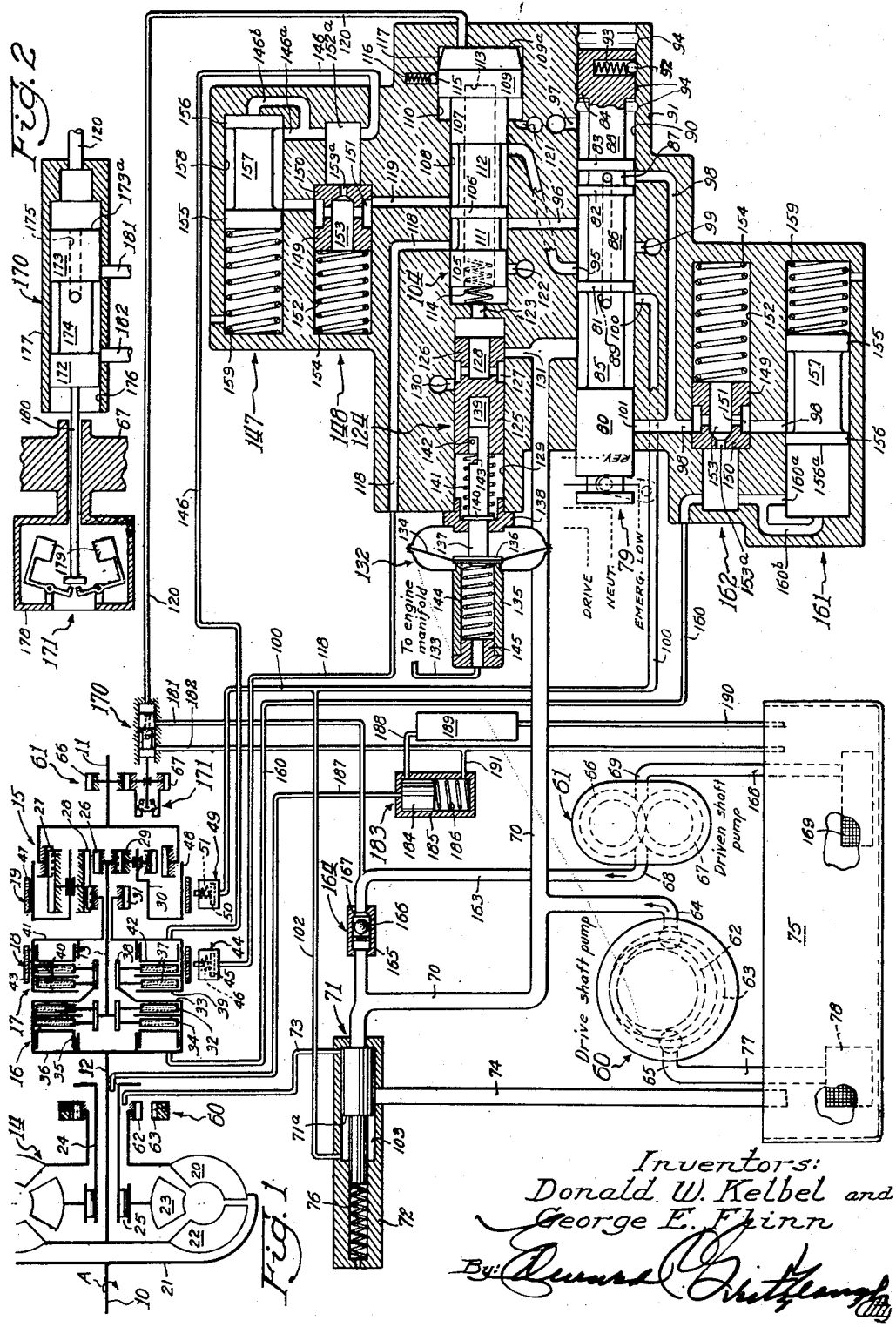
Inventors:
Donald W. Kelbel and
George E. Flinn

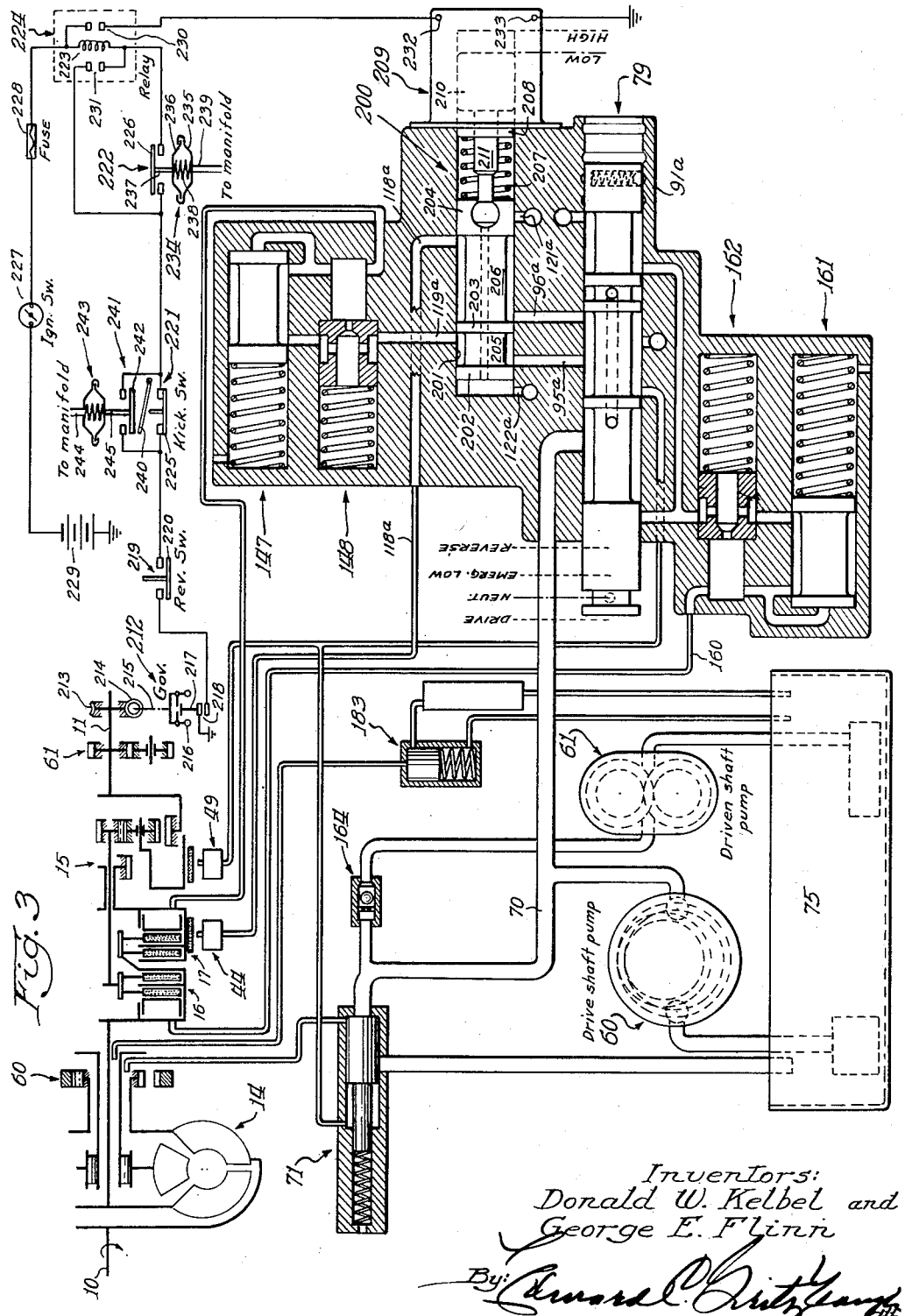

United States Patent Office 2,693,711
Patented Nov. 9, 1954

2,693,711

TRANSMISSION

Donald W. Kelbel and George E. Flinn, Muncie, Ind., assignors to Borg-Warner Corporation, Chicago, Ill., a corporation of Illinois Application January 19, 1950, Serial No. 139,426

7 Claims. (Cl. 74—472)

Our invention relates to transmissions for automotive vehicles and more particularly to controls for such transmissions.

It is an object of our invention to provide improved automatic transmission controls which includes a hydraulic shift valve having a position corresponding to a relatively low speed ratio and a position corresponding to a relatively high speed ratio in the transmission and which is actuated by hydraulic pressure that varies in intensity according to the speed of the driven shaft of the transmission, with this variable hydraulic pressure being produced by means of a hydraulic governor which includes a plurality of pivotally mounted weights exerting force on a regulating valve in accordance with the centrifugal force on the weights.

It is another object of the invention to provide a pump for supplying fluid to the governor which is also driven by the driven shaft of the transmission, so that fluid is supplied to the governor when the driven shaft is rotating forwardly, that is, in the same direction of rotation as the drive shaft of the transmission, but the pump rotates in the opposite direction so as to supply no fluid to the governor when the drive is in reverse. The hydraulic governor thus does not produce a pressure for reverse drive tending to shift the shift valve.

It is another object of the invention to provide an improved type of governor which comprises the pivotally mounted weights above-mentioned mechanically linked to the regulating valve, so that the valve tends to open pressure supply and pressure discharge conduits with an increase in centrifugal force on the weights and the pressure in the discharge conduit tends to move the valve to positions closing the two conduits with respect to each other and against the force provided by the weights.

It is another object of the invention to provide an improved arrangement for supplying fluid under pressure at an initially high rate to fluid pressure actuated clutches for completing forward and reverse power trains, respectively, and for thereafter metering the fluid under pressure supplied to the clutches at a lower rate, so that a gradual clutch engagement is provided, but an unduly long overall period of time is not required for clutch engagement.

It is another object of the invention to provide regulating mechanism which supplies a higher fluid pressure for engaging friction engaging means for low forward and reverse drives through the transmission as compared with intermediate and direct forward drives through the transmission, which mechanism includes a regulator valve having a chamber for fluid which is effective to cause valve regulating action to provide this higher pressure and which mechanism includes means for supplying fluid to this chamber for low forward and reverse drives through the transmission.

It is a further object of the invention to provide an electrical system for controlling a transmission which includes a kickdown switch under the influence of the accelerator of the vehicle which is opened when the accelerator is moved to an open throttle kickdown position and which is effective when so opened to change the speed ratio of the transmission from a high forward power train to a lower forward power train and to provide in parallel with this switch a limit switch which is closed above a predetermined speed of the vehicle so as to prevent such a kickdown and which is controlled for this purpose by means of a vacuum motor connected with the fuel intake manifold of the vehicle engine.

The invention consists of the novel constructions, arrangements and devices to be hereinafter described and claimed for carrying out the above-stated objects and such other objects as will appear from the following description of preferred embodiments of the invention, illustrated with reference to the accompanying drawings, wherein:

Fig. 1 is a diagrammatic illustration of a transmission and a control system for the transmission which embodies the principles of the transmission;

Fig. 2 is a sectional view through governor mechanism forming a portion of the transmission controls illustrated in Fig. 1; and Fig. 3 is a partial diagrammatic illustration of the transmission illustrated in Fig. 1 and a modified control system for the transmission.

Like characters of reference designate like parts in the several views.

Referring now to Fig. 1 of the drawings, the illustrated transmission comprises a drive shaft 10, a driven shaft 11, an intermediate shaft 12 and a second intermediate shaft 13. The shafts 12 and 13 are piloted by any suitable bearing means (not shown) with respect to the shafts 10 and 11, and all of these shafts are intended to be rotatably disposed and held in alignment with each other within a suitable transmission casing (not shown). The drive shaft 10 is adapted to be connected to the crank shaft of an internal combustion driving engine (not shown) of the vehicle, and the driven shaft 11 is adapted to be connected to the driving road wheels (not shown) of the vehicle.

The transmission comprises in general a hydraulic torque converter 14, a planetary gear unit 15, friction clutches 16 and 17 and friction brakes 18 and 19. The hydraulic torque converter 14 comprises a bladed impeller 20 connected to be driven by the flywheel 21 which in turn is connected with the drive shaft 10. The torque converter comprises also a bladed runner or driven element 22 and a bladed stator or reaction element 23. The runner 22 is connected to drive the intermediate shaft 12, and the stator 23 is mounted to rotate in one direction on a stationary sleeve shaft 24. A one-way roller brake 25 of any suitable construction is disposed between the stator 23 and the shaft 24 and functions to allow rotation of the stator in the forward direction, that is, in the same direction the shaft 10 is driven which is indicated by the arrow A and to brake the stator 23 from rotation in the reverse direction. The three vaned elements 20, 22 and 23 are in the same fluid housing which is formed by the impeller 20, and the function of the torque converter 14 is to drive the intermediate shaft 12 initially at increased torque due to the function of the reaction element 23 and the brake 25 holding the reaction element against reverse rotation and subsequently to drive the shaft 12 from the shaft 10 substantially at the same speed and with no increase in torque when the one-way brake 25 has ceased to hold the reaction element 23 against reverse rotation and the element 23 is rotating freely in the forward direction. The function of the torque converter 14 is similar to well known converters of this type, and hence further description of the operation and detailed construction of the converter is not deemed necessary.

The planetary gear set 15 comprises a sun gear 26, a ring gear 27, an elongated planet gear 28, a planet gear 29, a carrier 30 for the gears 28 and 29 and a second sun gear 31. The gears 28 and 29 are in mesh, and the gear 28 is also in mesh with the ring gear 27, and the gear 29 is also in mesh with the sun gear 26. The planet gear 28 is also in mesh with the sun gear 31. The ring gear 27 is connected with the driven shaft 11, and the sun gear 26 is connected with the intermediate shaft 13. Both of the sun gears 26 and 31 are adapted to be driven from the shaft 12, the sun gear 26 being connected with the shaft by means of the clutch 16 and the sun gear 31 being connected with the shaft 12 by means of the clutch 17.

The clutch 16 comprises clutch discs 32, pressure plates 33 and 34 and a piston 35. The discs 32 are splined to the shaft 13 and are adapted to be compressed in frictional relation with the pressure plates 33 and 34 by means of the piston 35. The plate 33 constitutes a part of a casing 36 connected with the shaft 12, and the plate 34 is connected to rotate with the casing 36. The piston 35 is slidably disposed in a suitable cavity within the casing 36.

The clutch 17 is somewhat similar in construction and comprises friction discs 37 splined on to an extension 38 of the casing 36, pressure plates 39 and 40 fixed with respect to a casing 41 and a piston 42 slidably disposed within a suitable cavity in the casing 41 and adapted to compress the discs 37 in frictional engagement with the plates 39 and 40 and itself. The casing 41 is fixed to the sun gear 31.

The brake 18 comprises a brake band 43 adapted to engage the outer surface of the casing 41 for thereby braking the sun gear 31 connected with the casing. The brake is adapted to be applied by means of a fluid pressure motor 44 which comprises a piston 45 acting on the band by any suitable linkage (not shown) and a spring 46 effective for yieldably holding the piston in its brake disengaging position.

The brake 19 comprises a brake band 47 effective on a drum portion 48 of the carrier 30 for braking the carrier. A fluid pressure motor 49 is provided for engaging the band and comprises a piston 50 acting on the band by any suitable linkage (not shown) and a spring 51 effective for yieldably holding the piston in its brake disengaging position.

The illustrated transmission provides low, intermediate and high speed forward drives and a drive in reverse. With the clutches 16 and 17 and the brakes 18 and 19 disengaged, the transmission is in neutral condition. For a low speed forward drive, the clutch 16 and the brake 19 are engaged, and a power train is thereby completed from the drive shaft 10 through the torque converter 14 and its runner 22 to the intermediate shaft 12, through the clutch 16, the shaft 13 and the planetary gear set 15 to the ring gear 27 and the driven shaft 11 connected therewith. Since there is a pair of planet gears 29 between the sun gear 26 and the ring gear 28 and since the carrier 30 is held stationary by the brake 19, the ring gear 27 is rotated at a reduced speed with respect to and in the same direction as the sun gear 26, and there are thus two torque multipliers in the power train, namely, the hydraulic torque converter 14 and planetary gear set 15.

The second speed forward drive power train is subsequently completed by disengaging the brake 19 and engaging the brake 18, allowing the clutch 16 to remain engaged. The drive in this case is the same as in low speed forward drive except that the sun gear 31 instead of the carrier 30 is utilized as the reaction element of the gear set, and the ring gear 27 and thereby the driven shaft 11 are driven at a higher but reduced speed with respect to the sun gear 26.

The high speed forward drive may be subsequently completed by disengaging the brake 18 and engaging the clutch 17. The drive in this case is from the drive shaft 10 through the torque converter 14 and its runner 22 to the intermediate shaft 12 and thence through the clutches 16 and 17, the sun gears 26 and 31 and the remainder of the planetary gear set 15 including the ring gear 27 to the driven shaft 11. Engagement of both of the clutches 16 and 17 locks up the planetary gear set, so that all of its elements rotate together as a unit, and there exists a direct drive between the shafts 12 and 11. Although the torque converter 14 may, for this drive also, convert torque, it is contemplated that the torque converter shall generally be used in this drive as a simple fluid coupling, with the bladed reaction member 23 rotating along with the impeller 20 and runner 22.

A drive in reverse is completed by engaging the clutch 17 and the brake 19. The drive in this case is from the drive shaft 10 through the converter 14 and its runner 22 to the intermediate shaft 12, through the clutch 17, the sun gear 31 and the remainder of the planetary gear set 15 to the driven shaft 11. The carrier 30 in this case functions as the reaction element of the planetary gear set, and since there is only the single planetary gear 28 between the driving sun gear 31 and the driven ring gear 27, the ring gear and thereby the shaft 11 are rotated in the reverse direction at a reduced speed with respect to the shaft 12. The converter 14 may also convert torque for this drive as for the forward drives.

The transmission as described thus far and illustrated diagrammatically in Fig. 1 could, it is believed, be built from this description and showing by a person skilled in the art; however, for more details of construction a copending application, Serial No. 761,615, filed July 17, 1947, now Patent #2,605,652, which shows a very similar transmission, may be referred to.

The control system for the transmission comprises a drive shaft hydraulic pump 60 and a driven shaft hydraulic pump 61. The drive shaft pump 60 is of an ordinary type and comprises a gear 62 driven through the impeller 20 of the torque converter 14 and the flywheel 21 from the shaft 10. The gear 62 is eccentrically disposed in an internal gear 63 and is in mesh with the latter gear, and the pump has an outlet 64 and an inlet 65. The pump 61 is also of an ordinary type and comprises a gear 66 driven by the driven shaft 11 and in mesh with a gear 67. The pump 61 has an outlet 68 and an inlet 69.

The pump 60 discharges into a fluid supply conduit 70, the pressure in which is regulated by a regulating valve 71. The valve 71 is slidably disposed in a casing 72 which is in communication with the fluid supply conduit 70 and passages 73 and 74 entering the casing in the relative positions, as shown. The conduit 73 is adapted to provide fluid to the torque converter 14 by means of which a drive is completed through the torque converter, and the conduit 74 is a fluid relief conduit connected to an oil supply tank or sump 75. A regulator spring 76 acts on the valve 71, as shown.

The pump 60 has an intake conduit 77 connected with the oil supply tank 75, and an oil cleaning screen 78 is provided on the conduit 77.

The transmission is conditioned for various types of operation by means of a manual control valve 79. The valve comprises lands 80, 81, 82, 83 and 84 and grooves 85, 86, 87 and 88. The grooves 85 and 87 are connected by an internal passage 89. The valve 79 is slidably disposed in a cylinder 90 formed in a valve block 91. The valve is adapted to be manually controlled by any suitable control mechanism by means of which the valve may be moved into any of its four principal positions, which are "reverse," "emergency low," "neutral" and "drive" and are indicated in the drawing. Detent means are provided for yieldably holding the valve 79 in its principal positions which comprises a ball 92 and a spring 93 pressing on the ball and disposed in a pocket in the land 84. The ball is adapted to seat in depressions 94 formed in the casing 91 which are so located that the ball holds the valve 79 in one of its principal positions for each of the depressions 94. The cylinder 90 has the conduit 70 and also conduits 95, 96, 97, 98, 99, 100 and 101 connected therewith. The conduit 70 is the fluid pressure supply conduit, as has been described. The conduits 97 and 99 are bleed conduits connected to freely discharge fluid into the sump 75. The conduit 100 is connected with the fluid pressure motor 49 for the brake 19 for supplying fluid under pressure to engage the brake. The conduit 100 is also connected with the valve 71 by means of a branch conduit 102 and is adapted to provide fluid under pressure within a cavity 103 in the valve 71 for purposes to be described.

The conduit 96 is a pressure supply conduit for operation of the transmission in its "drive" range, as will be described, and supplies fluid under pressure to a second-high shift valve 104. The valve 104 comprises lands 105, 106 and 107 which are slidably disposed in a cylinder portion 108 and an enlarged end land 109 which is slidably disposed in a cylinder portion 110. Grooves 111 and 112 are provided between the lands 105, 106 and 107, as shown. The valve 104 is provided with an internal cylindrical cavity 113 in which a compression spring 114 is disposed, the spring being disposed between the inner end of the cavity 113 and the opposite end of the cylinder portion 108. Detent means is provided for the valve 104 which comprises a ball 115 acted on by a spring 116 and disposed in a recess in the valve casing 91. The valve 104 is provided with a tapered end 117, and the ball is adapted to contact and coact with the tapered end so as to tend to hold the piston 104 in a position to the left of its illustrated position and against the action of the compression spring 114. The valve 104 has the conduits 95 and 96 connected therewith, as shown, and has additional conduits 118, 119, 120, 121 and 122 connected therewith. The conduit 118 is connected with the brake motor 44, and the conduits 121 and 122 are fluid bleed conduits arranged to discharge fluid into the sump 75.

A fluid pressure which varies in accordance with the output torque of the vehicle engine and the torque demand by the vehicle operator is impressed through the conduit 123 on the valve 104. A valve 124 is utilized for providing this variable pressure. The valve 124 is provided with lands 125 and 126 and a groove 127 between the lands. The groove 127 is connected by means of a passage 128 with an end of the valve. The valve 124 is slidably disposed in a cylindrical cavity 129 which is connected with conduits 130 and 131 and also with the conduit 123. The conduit 130 is a fluid bleed conduit connected to discharge into the sump 75, and the conduit 131 is connected with the fluid pressure supply conduit 70.

The valve 124 is controlled by a vacuum motor 132 which is connected by means of a conduit 133 with the fuel intake manifold of the internal combustion driving engine of the vehicle. The vacuum in such a manifold, as is well known, progressively decreases (and the absolute pressure in the manifold increases) with increases of the output torque of the vehicle engine and the torque demand by the vehicle operator as evidenced by the position in which the vehicle accelerator is put, and this vacuum is effective on the motor 132. The motor 132 comprises a flexible diaphragm 134 connected by means of a casing portion 135 and the conduit 133 with the engine manifold, so as to have the manifold vacuum impressed thereon. The diaphragm 134 is fixed by means of washers 136 to a longitudinally movable rod 137 which extends through a washer like element 138 and into a cylindrical cavity 139 in the valve 124. A ring 140 is fixed on the rod 137, and a spring 141 is provided between the ring and the adjacent end of the valve 124. The rod 137 is connected with the valve 124 by means of a pin 142 fixed in the valve and disposed in a slot 143 formed in the rod 137. A spring 144 is disposed between an end 145 of the casing portion 135 and the washers 136. The valve 124 provides a regulated fluid pressure in the conduit 123 and impressed on the valve 104, as will be hereinafter described, the motor 132 functioning to operatively connect the vehicle engine and the valve 124.

The conduit 119 is connected with a conduit 146 by means of valves 147 and 148. The conduit 146 is connected with the clutch piston 42 for supplying fluid pressure to the clutch piston, and the valves 147 and 148 function to control the flow of fluid through the conduits 119 and 146 to the clutch piston, as will be described. The valve 148 comprises lands 149 and 150 separated by a groove 151, and the valve is slidably disposed in a cylinder 152. The valve has a central passage 153 extending therethrough, and the valve is acted on by a spring 154 extending between the valve and an end of the cylinder 152. The central passage 153 has a constricted portion 153a opening into a cylinder portion 152a of reduced diameter, and the shoulder between the main part of the cylinder 152 and its reduced portion 152a forms a seat for the valve 148 on which it rests in its illustrated position. The valve 147 comprises lands 155 and 156 separated by a groove 157. The valve is slidably disposed in a cylinder 158 and is acted on by a spring 159 disposed between the valve and an end of the cylinder 158.

The conduit 146 is connected with the cylinder portion 152a, as shown, and also by means of conduit portions 146a and 146b with the valve 147. The conduit portion 146b enters the cylinder 158 at an end thereof, and the conduit portion 146a enters the cylinder 158 at the side, as shown. The conduit 119 enters the cylinder 152 at the side and is in communication with the groove 151 in the valve 148 in the illustrated position of the valve.

A conduit 160 is connected with the clutch piston 35, and two valves 161 and 162 are disposed effectively between the conduits 98 and 160. The valves 161 and 162 are similar in construction to the valves 147 and 148 respectively. The conduit 98 is connected with the valves 161 and 162 in the same manner as the conduit 119 is connected with the valves 147 and 148, and the conduit 160 is connected with the valves 161 and 162 in the same manner as the conduit 146 is connected with the valves 147 and 148.

The outlet 68 of the pump 61 is connected through a conduit 163 with the fluid pressure supply conduit 70, and a check valve 164 is disposed in the conduit 163. The check valve 164 comprises a valve casing 165 in which a ball 166 is movably disposed. The ball is adapted to rest on a seat 167 under the influence of fluid pressure within the conduit 70 so as to block the conduit 163. The pump 61 at its inlet is connected by means of a conduit 168 to draw fluid from out of the sump 75, and a screen 169 is provided on the inlet end of the conduit 168.

As has been previously mentioned, there exists in the conduit 120 a fluid pressure that varies in accordance with the speed of the driven shaft 11, and this pressure is regulated by means of a valve 170 (see Figs. 1 and 2) under the control of a governor 171. The valve 170 comprises lands 172 and 173 separated by a groove 174. The groove 174 is connected with the right end of the valve by means of an internal cavity 175. The valve is slidably disposed in a cylindrical cavity 176 provided in a casing 177.

The governor 171 comprises a casing 178 in which centrifugal weights 179 are swingably disposed. The weights 179 on moving outwardly under the influence of centrifugal force act on a rod 180 which is connected with the valve 170 for moving the valve. The casing 178 is connected to rotate with the gear 67 of the pump 61, and the rotation of the governor thus varies in speed with the driven shaft 11. The cylinder 176 is connected, in addition to the conduit 120, also with a fluid pressure supply conduit 181 and a fluid bleed conduit 182. The conduit 181 is connected with the discharge conduit 163 for the driven shaft pump 61, and the conduit 182 is arranged to discharge into the sump 75.

A valve 183 for regulating the pressure of the fluid in the converter 14 is provided. The valve 183 comprises a piston 184, slidably disposed in a hollow cylindrical casing 185, and a spring 186 acting on the piston. The casing 185 is connected by means of a conduit 187 with the converter, and the casing is also connected by a conduit 188 with a cooler 189 which is drained to the sump 75 by means of a conduit 190. The casing 185 below the piston 184 is also connected by means of a conduit 191 with the conduit 182 draining into the sump 75. The cooler 189 may be of any construction suitable for cooling liquid flowing therethrough, and, for example, may take the form of an ordinary automobile water cooling radiator.

In operation, the transmission is conditioned for neutral condition, in which there is no driving connection between the shafts 10 and 11, by moving the valve 79 into its "neutral" position, which is indicated in the drawing to be to the left of its illustrated position. It is assumed that the engine of the vehicle is operating at idling speed, and the pump 60 is thereby driven through the impeller 20 of the torque converter 14 and the flywheel 21, so that the pump functions to draw oil out of the sump 75 and supply it to the conduit 70. The oil pressure within the conduit 70 is maintained at a predetermined maximum value by means of the regulator valve 71. The fluid under pressure in the conduit 70 acts on an end of the valve 71 so as to move it to the left as seen in the drawing against the action of the spring 76 and partially open the conduit 74 with respect to the conduit 70, whereby the excess fluid within the conduit 70 is drained back into the sump 75 through the conduit 74. As will be understood, the valve 71, as the pressure in the conduit 70 tends to become excessively high, moves to open the conduit 74 to a greater extent for limiting the increase in pressure in the conduit 70, while if the pressure in the conduit 70, for any reason, tends to decrease below the regulated value desired, the spring 76 moves the valve 71 to close the conduit 74. The net effect of the valve 71 is thus to regulate the pressure in the conduit 70 to the desired predetermined value for which the spring 76 is set.

The torque converter 14 is supplied with fluid from the conduit 70 through the conduit 73 which is connected with the conduit 70 when the valve 71 is opened. The fluid flows through the conduit 73 into the converter 14 and flows out of the converter through the conduit 187 to the regulator valve 183 which functions to maintain the pressure of the fluid within the converter at a predetermined value. The regulator valve 183 functions similarly to the valve 71 in that the piston 184 moves downwardly as seen in the drawing against the action of the spring 186 to open the conduit 188 to the conduit 187 on the fluid pressure in the converter 14 reaching the predetermined value desired. The piston 184 opens the conduit 188 just sufficiently to maintain this pressure, as will be understood. The excess fluid flowing through the converter 14 through the conduit 188 flows through the cooler 189 and conduit 190 back into the sump 75, and the cooler 189 functions to dissipate heat in the fluid flowing through the torque converter and maintain it at desired low temperatures.

The ball 166 of the check valve in the neutral condition of the transmission is held against its seat 167 by fluid pressure from the conduit 70 acting on the ball so as to prevent any fluid from the pump 60 from entering the pump 61 and leaking through the latter pump and the conduit 168 back into the sump 75. It is assumed that the driven shaft 11 in this case is stationary, and the pump 61 is not operative.

The groove 85, in the neutral position of the manually controlled valve 79, and the groove 87 in communication with the groove 85 by means of the passage 89 are in communication with the fluid pressure supply conduit 70 but are not in communication with any of the other conduits connected with the piston cylinder 90, and the valve 79 in this position is thus not operative to cause engagement of any of the brakes and clutches in the transmission.

For ordinary forward driving conditions of the vehicle, the manual shift valve 79 is moved into its "drive" position which is indicated in Fig. 1. In this position of the valve 79, the groove 85 is in communication with both the fluid supply conduit 70 and also the conduit 101, and the groove 87 connected with the groove 85 is in communication with the conduit 96, whereby fluid under pressure is supplied to both conduits 101 and 96. The valve 104 is in its illustrated position, and the fluid in the conduit 96 flows through the groove 111 into the conduit 118 and is thereby supplied to the motor 44 for applying the brake 18. The conduit 101 is in communication with the conduit 160 through the conduit 98 and the valves 161 and 162 for supplying fluid under pressure to the piston 35 for the clutch 16 for applying this clutch; however, the application of the fluid to the conduit 160 and piston 35 is controlled for providing a gradual engagement of the clutch by the valves 161 and 162 as will now be described.

Fluid under pressure within the conduits 101 and 98 initially flows through two paths to the conduit 160. The fluid flows through the groove 151 in the valve 162 and conduit 98 to the valve 161 and through the groove 157 in the valve 161 to the passage 160a and thence to the conduit 160. The fluid also flows through the groove 151 and the internal passage 153 including its constricted portion 153a directly to the conduit 160. A relatively fast initial application of fluid under pressure is thus made to the clutch piston 35. The fluid pressure impressed on the clutch piston 35 is also impressed through the conduit 160 and the conduit portion 160b on the face 156a of the valve 161 tending to move the valve 161 against the action of the spring 159 so as to bring the groove 157 out of communication with the conduit branch 160a. When the valve 161 has moved sufficiently to disconnect the conduit 98 and the conduit branch 160a, the fluid flow between the conduits 98 and 160 is thus reduced to the amount of fluid that can flow through the restricted passage portion 153a. Thus, the valves 161 and 162 provide an initial relatively fast flow of fluid into the conduit 160 and to the piston 35 and subsequently a relatively slow flow of fluid into the conduit 160 and to the piston 35. The clutch 16 is thus initially applied to some extent relatively quickly and the complete application of the clutch 16 to a non-slipping condition subsequently takes place relatively slowly. As has been described, application of both the brake 18 and the clutch 16 provides the second or intermediate forward drive power train through the transmission between the shafts 10 and 11, and the gradual application of the clutch 16 by means of the valves 161 and 162 renders the completion of the power train through the transmission correspondingly gradual, so that an undue lurch is not given the vehicle.

The shift from second speed forward drive to high speed forward drive is automatic and is under the control of the speed of the vehicle and the driven shaft 11 and also the vehicle engine torque output and torque demand of the vehicle by the operator. The valve 104 is shifted in order to cause this change of speed ratio. The conduit 120 contains fluid under pressure that varies in accordance with the speed of the driven shaft 11, and this fluid pressure is applied to the face 109a of the valve and tends to move the valve to the left as seen in the figure against the action of the spring 114. This variable fluid pressure in the conduit 120 is provided by the governor 171 and the governor valve 170, as will be described. The conduit 123 contains fluid under pressure that varies with the torque output of the engine, and this fluid pressure is applied to the opposite end of the valve 104 and assists the spring 114 in holding the valve to the limit of its movement to the right, as it is shown in the figure and in moving the valve back into its illustrated position from its shifted position. This variable fluid pressure in the conduit 123 is provided by the vacuum motor 132 and the valve 124 connected therewith, as will be described.

The pump 61, when the shaft 11 is rotated in forward drive, draws fluid from the sump 75 by means of the conduit 168 and discharges into the conduit 163. When the pressure in the conduit 163 becomes great enough, the ball 166 moves off its seat 167 and opens the conduit 163 with respect to the conduit 70 so that both the pumps 61 and 60 in effect discharge into the same fluid pressure conduit 70 and are relieved by the same regulator valve 71. The conduit 181 which is a fluid pressure supply conduit for the governor valve 170 is connected with the conduit 163, so that fluid pressure is available for the governor valve 170 when the driven shaft pump 61 is driven by the shaft 11. The casing 178 carrying the weights 179 rotates with the gear 67, and as the speed of the gear 67 and the shaft 11 increase, the weights rotate about their pivotal connection with the casing 178 and act against the adjacent end of the longitudinally movable rod 180 connected with the valve 170. The weights 179 thus exert a force on the rod 180 varying in intensity with the speed of the shaft 11 and through the rod tend to move the valve 170 to the right as seen in the figure for connecting the conduit 181 with the conduit 120 through the central bore 175 in the valve 170. When the valve 170 is thus moved, fluid under pressure is thereby supplied to the conduit 120, and this fluid under pressure is applied to the end 173a of the valve and applies a force to the valve tending to move the valve to the left, as seen in the figure, to oppose the action of the weights 179. These two forces acting on the valve 170, namely, the force due to the weights 179 acting to move the valve 170 to the right, as seen in the figure, to connect the conduits 181 and 120 and the force of the fluid pressure in the conduit 120 acting to move the valve back in the opposite direction to disconnect the conduits 181 and 120, give to the valve 170 a regulating action to provide a fluid pressure in the conduit 120 that increases with the speed of the driven shaft 11. The conduit 182, which drains into the sump 75, is in communication with the groove 174 and thereby the conduit 120 through the central bore 175 of the valve 170 when the valve 170 moves to the left upon a decrease in speed of the driven shaft 11 and functions to reduce the fluid pressure in the conduit 120 in accordance with the decrease in speed of the shaft 11.

As has been explained, the vacuum in the fuel intake manifold of the vehicle engine varies with the torque output of the engine and with the torque demand by the vehicle operator, as evidenced by the position of the vehicle accelerator. The vacuum increases with a decrease in torque output and torque demand and the vacuum decreases with an increase in torque output and torque demand. The vacuum is exerted on the diaphragm 134, and when the vacuum is high, it tends to hold the diaphragm 134 and the rod 137 in their illustrated positions at the limits of their movement to the left against the action of the spring 144. The rod 137 in its illustrated position holds the valve 124 in its illustrated position in which the land 126 of the valve blocks the conduit 131 connected with the fluid pressure supply conduit 70; and the groove 127, the central passage 128 and thereby the conduit 123 are connected with the fluid bleed conduit 130 adapted to drain fluid freely into the sump 75. With a high manifold vacuum corresponding to a minimum torque output of the engine, there thus is substantially no fluid under pressure in the conduit 123.

As the vacuum in the engine manifold exerted on the diaphragm 134 decreases with increased engine torque output, the spring 144 moves the rod 137 to the right, and the spring 141 between the collar 140 on the rod 137 and the valve 124 moves the valve 124 to the right so that its groove 127 is connected with the fluid supply conduit 131 and is disconnected from the drain conduit 130. Fluid under pressure is thus supplied to the groove 127 and the conduit 123 through the central bore 128. The fluid pressure in the conduit 123 is effective on the right end of the valve 124 and tends to move the valve back into a position closing the fluid pressure supply conduit 131 against the action of the springs 141 and 144, and when the fluid pressure in the conduit 123 increases to a valve corresponding to the decreased vacuum in the engine manifold and increased torque output of the engine, the valve does move back in this manner, a further decrease in vacuum corresponding to a further increase in engine output torque causes a further movement of the valve 124 to the right, causing a further increase in the fluid pressure in the conduit 123 in the same manner. Assuming that the manifold vacuum subsequently increases with a decrease in engine output torque, the fluid pressure in the conduit 123 will act against the springs 144 and 141 to move the valve 124 back toward its illustrated position in which the groove 127 is in communication with the drain conduit 130, and the fluid pressure in the conduit 123 will be relieved so that it decreases to a value corresponding to the increased vacuum in the engine manifold. In brief, the valve 124 functions to regulate the fluid pressure in the conduit 123 to increase the fluid pressure therein from the conduit 131 with decreased manifold vacuum and to decrease the fluid pressure in the conduit 123 allowing it to drain through the drain conduit 130 with increased vacuum in the engine manifold, so that the pressure in the conduit 123 varies directly with engine torque.

As has been described, the shift valve 104 is illustrated in its second speed position in which it causes engagement of the brake 18 and clutch 16 for intermediate drive. When the fluid pressure in the conduit 120 that varies with the speed of the driven shaft 11 and is impressed on the valve face 109a becomes sufficiently great, the valve 104 moves to the left to a shifted, third speed position in which its groove 112 connects the conduits 96 and 119 and the groove 111 connects the conduits 118 and 122. This movement of the valve 104 is against the force on the opposite side of the valve due to the fluid pressure in the conduit 123 that varies with the engine output torque and the force due to the spring 114. Since the pressure in the conduit 123 is variable, the speed of the driven shaft 11 at which this shift of the valve 104 occurs is variable; the shift will occur at higher speeds of the driven shaft 11, the greater the output torque of the engine. The forces due to the fluid pressure in the conduit 120 and in the conduit 123 on opposite ends of the valve act against each other, and the force due to the pressure in the conduit 120 must overbalance the force due to the pressure in the conduit 123 and that due to the spring 114 before the valve 104 can shift. The ball 115 acted on by the spring 116 acts on the tapered surface 117 when the valve 104 is in its third speed, shifted position and acts as detent means for yieldably holding the valve in its shifted position.

The valve 104 in its shifted position, as has been described, connects the conduits 122 and 118 by means of the groove 111 and connects the conduits 96 and 119 by means of the groove 112. The conduit 118 is connected with the motor 44 for the brake 18, and the brake motor 44 is drained of fluid through the bleed conduit 122, and the brake 18 is thereby disengaged. The conduit 96 is connected with the fluid supply conduit 70 by means of the groove 85, the passage 89, and the groove 87 in the "drive" position of the valve 79, as has been described, and in the shifted position of the valve 104, this fluid pressure is applied to the conduit 119. The conduit 146 is connected with the conduit 119 by means of the valves 147 and 148, and fluid under pressure is supplied by means of the conduit 146 to the piston 42 for engaging the clutch 17. As has been previously described, when both the clutches 16 and 17 are engaged, the transmission drives in direct drive. The valves 147 and 148 function in the same manner as the valves 161 and 162 for initially providing a relatively unrestricted connection between the conduits connected by the valve and subsequently providing a restricted fluid connection between the conduits, for providing a relatively fast initial partial engagement of the clutch piston being supplied with fluid pressure and subsequently metering the fluid to the clutch piston for gradually completing the engagement of the clutch. As is the case in connection with the valves 161 and 162, as has been described, the initial fast flow of fluid between the conduits 119 and 146 is through the groove 151 of the valve 148 and the groove 157 of the valve 147, and the subsequent metered flow of fluid from the conduit 119 to the conduit 146 is through the central passage 153 and its restriction 153a exclusive of the valve 147, after the valve 147 has been moved to break the connection between the groove 157 and the conduit branch 146a.

A downshift from third speed ratio to second speed ratio is obtained when the valve 104 moves back from its shifted position to its illustrated position. The valve 104 in its shifted, third speed, position is under the influence of the force due to the fluid pressure in the conduit 123 and that due to the spring 114 impressed on its left end tending to shift the valve back to its second speed position and is under the influence of the force due to the fluid pressure in the conduit 120 and the force due to the yieldable detent mechanism including the ball 115 and the spring 116 tending to hold the valve 104 in its shifted position. When the forces on the left end of the valve overbalance those on the right end of the valve, as by an increase in the engine torque output or by a decrease in the speed of the driven shaft 11 or both, the valve 104 moves to the right, back into its illustrated position. In this position, the conduit 96 carrying fluid pressure is again connected with the conduit 118 for applying the brake 18, and the transmission is again in second speed ratio. The conduit 119 connected through the valves 147 and 148 with the conduit 146 is connected to drain to the sump through the groove 112, the conduit 95, the groove 86 and the conduit 99 for relieving the fluid pressure on the clutch piston 42 for disengaging the clutch 17. The valve 148 functions when the fluid pressure in the conduit 119 is relieved to allow a rapid drain of the fluid pressure in the conduit 146 by moving against the spring 154 to directly connect the conduit 146 and the conduit 119. In the third speed condition of the control system, the cylinder 152 for the valve 148 contains fluid under substantially the same pressure as that impressed on the clutch piston 42, and the valve 148 is hence in its illustrated position, being held in this position by means of the spring 154. When, however, the conduit 119 is drained to the sump, the fluid in the cylinder 152 behind the piston 148 flows through the groove 151 and into the conduit 119 faster than the fluid in the conduit 146 due to the presence of the restriction 153a through which the fluid in the conduit 146 must flow. The fluid pressure in the conduit 146 at this time becomes of sufficient relative magnitude relative to the force of the spring 154 so as to move the valve 148 to the left as seen in the figure against the action of the spring 154 whereby the valve provides the direct connection between the conduit 146 and the conduit 119, and a rapid drain of the fluid impressed on the clutch piston 42 is thereby provided. Thus, although the valves 147 and 148 provide a gradual engagement of the clutch 17, they function so as to provide a substantially instantaneous disengagement of the clutch.

The transmission is shifted into its "emergency low" condition by moving the valve 79 into the corresponding position in which it is illustrated in Fig. 1. In this position, the valve connects the pressure supply conduit 70 with the conduit 100 by means of the groove 85 and with the conduit 98 by means of the same groove and the passage 89 and the groove 87. The conduit 100 is connected with the motor 49 for the brake 19, and fluid pressure is thereby applied to the motor for engaging the brake. The conduit 102 is connected with the conduit 100, and fluid pressure is thereby applied in the space 103 to the face 71a of the valve 71. This fluid pressure functions to assist the spring 76 in moving the valve to the right as seen in Fig. 1. The fluid pressure within the conduit 70, due to this increased force tending to move the valve 71 to the right and to close the discharge conduit 74, thus increases a predetermined amount above that pressure in the conduit 70 which is present for the "drive" condition of the transmission. By this arrangement, an increased pressure for the band 47 for low and reverse is provided without the necessity for a larger size fluid pressure motor 49 for applying the brake.

The fluid pressure in the conduit 98 flows through to the conduit 160 for applying the clutch 16, and the valves 161 and 162 function as before described to provide an initial fast application of fluid pressure to the piston 35 and thereafter a metered flow of fluid to the piston. With this application of the brake 19 and clutch 16, the transmission drives in emergency low ratio.

The transmission may be conditioned for reverse drive by moving the valve 79 into its "reverse" position. Fluid under pressure is supplied to the conduit 100 through the groove 85 as for low speed forward drive for engaging the brake 19 by means of the brake motor 49 and for increasing the pressure in the conduit 70 a predetermined amount over that present in the conduit for second and third speed drives through the transmission by means of the valve 71. Fluid under pressure is also supplied to the conduit 95 from the conduit 70 through the groove 85, and this fluid under pressure passes through the groove 112 of the valve 104 to the conduit 119 and from thence to the conduit 146 and to the piston 42 for engaging the clutch 17. The valves 147 and 148, as has been previously described, function to provide an initial rapid engagement of the clutch piston 42 and thereafter a controlled, relatively gradual, application of fluid pressure to the piston 42 for a correspondingly gradual engagement of the clutch 17. With the brake 19 and the clutch 17 engaged, the transmission drives in reverse.

The regular valve 183 functions to maintain the fluid within the converter 14 at a predetermined pressure. The piston 184 of the valve 183 moves downwardly as seen in Fig. 1 against the action of the spring 186 to open the conduit 188 to the conduit 187 when the pressure in the conduit 187 increases to the predetermined value for which the valve 183 is set. The piston 184 opens the conduit 188 just sufficiently to maintain this predetermined pressure in the converter. The fluid from the converter flows through the cooler 189, and the excess heat, if any, produced by the converter is dissipated by the cooler, so that the oil in the system does not become unduly heated.

The embodiment of the controls shown in Fig. 3 differs from the controls shown in Fig. 1 essentially by the substitution of an electrically operated valve 200 for the valve 104, and an electric controlling arrangement is used in connection with the valve 200 in lieu of the hydraulic governor 171 and the manifold vacuum controlled valve 124.

The electrically controlled valve 200 is slidably disposed in a cylindrical cavity 201 in the valve block 91a. The valve comprises lands 202, 203 and 204 and grooves 205 and 206 separating the lands. A spring 207 is effective between the land 204 and a part 208 fixed with respect to the casing 91a. An electric solenoid 209 having a movable armature 210 is provided for moving the valve 200, and the armature is connected by means of a rod 211 with the valve 200. Conduits 95a, 96a, 118a and 119a are connected with the cylinder 201, and these conduits are connected with the valve 79, the brake motor 44 and the valve 148, substantially the same as are the corresponding conduits 95, 96, 118 and 119 in the Fig. 1 embodiment. Conduits 121a and 122a are connected with the cylinder 201, and these, similar to the conduits 121 and 122 in the first embodiment, are bleed conduits.

The electrical controlling system for the solenoid 209 comprises a governor 212 which is driven by means of gears 213 and 214. The gear 213 is fixed to the driven shaft 11 of the transmission, and the gear 214 is fixed on a shaft 215 connected with the governor. The governor comprises a pair of pivotally mounted weights 216 rotatable with the shaft 215 and effective on a longitudinally movable pin 217. The pin 217 is effective on a movable one of a pair of contacts 218 for closing the contacts when the driven shaft 11 attains a predetermined speed.

One of the contacts 218 of the governor 212 is grounded as shown, and the other contact 218 is connected with a switch 219 comprising a switch arm 220. The switch 219 is connected in series with a switch 221 and a switch 222 and the winding 223 of a relay 224. The switches 221 and 222 respectively comprise switch arms 225 and 226 for closing the respective switches. The relay winding 223 is connected with a switch 227, which is also effective to control the ignition system (not shown) of the automotive vehicle, and the connection is through a fuse 228. The switch 227 is connected with the usual battery 229 of the automotive vehicle which has one terminal grounded in accordance with usual practice.

The relay 224 comprises a pair of contacts 230 and a pair of contacts 231. One of the contacts 230 is connected with the upper end of the relay winding 223, and the other contact 230 is connected with one of the terminals 232 of the solenoid 209, the other terminal 233 of the solenoid being grounded as shown. One of the contacts 231 is connected with the lower end of the winding 223, and the other contact 231 is connected between the switches 221 and 222, as shown.

The switch 222 is closed by means of a vacuum motor 234 which comprises a casing 235 having fixed therein a flexible diaphragm 236. The switch arm 226 is connected with the diaphragm by means of a rod 237, and a spring 238 is effective on the diaphragm. A conduit 239 is connected with the interior of the casing 235 and is connected with the fuel intake manifold of the vehicle engine (not shown).

The switch 221 may be termed a kickdown switch and is actuated by the accelerator 240 of the vehicle, so that when the accelerator is moved to a fully opened throttle position, the switch 221 is opened for purposes to be hereinafter described. The switch 219 may be termed a reverse switch, and this switch is opened whenever the vehicle is conditioned for neutral, emergency low or reverse, and the same manual actuating mechanism (not shown) for the valve 79 may be utilized for actuating the switch 219 if desired.

A switch 241 comprising a movable contact arm 242 is provided in parallel with the switch 221. The switch arm 242 is actuated by a vacuum motor 243 which is connected to the fuel intake manifold of the vehicle engine by means of a conduit 244 and is connected to the switch arm 242 by means of a rod 245. The motor 243 is similar in construction to the motor 234, and the motors function similarly to close the respective switches 241 and 222 on increases in vacuum in the engine manifold. As will hereinafter appear, the switch 222 is intended to be closed in accordance with a decrease in torque demand made on the vehicle engine by the operator, and the switch 241 is closed with an increase in vehicle speed. The manifold vacuum increases with both a decrease in torque demand attendant to a release of the vehicle accelerator toward closed throttle position and an increase in engine speed for overcoming the springs in the respective motors 243 and 234 for accomplishing these functions.

The valve 200 functions similarly to the valve 104 and has second speed and direct drive positions corresponding to the same positions of the valve 104 for connecting the corresponding fluid conduits in each of these two positions. The valve 200 is shown in its second speed position in which the valve connects the conduits 95a and 119a by means of the groove 205 and connects the conduits 96a and 118a by means of the groove 206. As will be recalled, the valve 104 in its second speed position in which it is illustrated, connects the corresponding conduits 96 and 118, and 95 and 119.

The valve 200 is moved to the right as seen in Fig. 3 by means of the armature 210 against the action of the spring 207 into a direct drive position in which it connects the conduits 96a and 119a and bleeds the conduit 118a. The conduits 96a and 119a are connected by means of the groove 205, and the groove 206 connects the conduit 118a with the bleed conduit 121a. As has been described in connection with the valve 104, in the direct drive position of the valve 104, the conduits 96 and 119 are connected, and the conduit 118 is bled to the sump 75. Since the two valves 200 and 104 connect corresponding conduits in their two corresponding positions, the valve 200 has the same effect on the transmission in both of its positions as does the valve 104, namely, causing a completion of the second speed drive in the second speed position of the valve and causing a completion of the direct drive in the direct drive position of the valve, assuming that the control valve 79 has been previously moved into its "drive" position.

The valve 200 is moved between its second speed and direct drive positions by means of the solenoid 209. The solenoid armature 210 is moved within the solenoid 209 against the action of the spring 207, when the solenoid is energized, for moving the valve 200 into its direct drive position, and the spring 207 functions to return the valve 200 to its second speed position when the solenoid 209 is deenergized. The contacts 230 of the relay 224 are utilized for completing a circuit from the battery 229 through the solenoid 209 for energizing the solenoid. The circuit is from the battery 229 through the switch 227, the fuse 228, the contacts 230 and thence through the solenoid 209. The contacts 230 are moved into closed relation under the influence of the relay winding 223.

The relay winding 223 has the switch 222, the switch 221, the switch 219 and the contacts 218 connected in series with it, so that, when these switches and contacts are closed, a circuit will be completed through the winding 223 for the purpose of energizing the relay 224 and closing the contacts 230 to energize the solenoid 209. The switch 222 is under the influence of the vacuum motor 234, and as is well known and as has been described in connection with the other embodiment of the invention, the vacuum in the intake manifold of the internal combustion engine varies in accordance with the accelerator position and with the torque output of the vehicle engine, being a maximum when the torque output is a minimum and being at a minimum when the torque output is greatest. The spring 238 in the motor 234 is so calibrated as to move the switch arm 226 to close the switch 222 when the torque output of the vehicle engine is at some minimum value corresponding to a closed or nearly closed throttle position of the accelerator 240. The kickdown switch 221 is closed except for an open throttle kickdown position of the accelerator. The reverse switch 219 is closed when the transmission is conditioned with the valve 79 in its "drive" position. The governor contacts 218 are closed when the speed of the vehicle and the speed of the driven shaft 11 are above predetermined values. The governor weights 216 rotate about their pivot points so as to move the rod 217 downwardly and move the contacts 218 together. Thus the relay winding 223 is energized when the vehicle is in "drive" condition, the vehicle accelerator is at a minimum engine torque position and the speed of the driven shaft 11 has attained a predetermined value. The shift from second speed to direct drive in the transmission thus occurs at this time.

The second pair of relay contacts 231 are closed under the influence of the winding 223 of the relay 224 simultaneously with the closing of the contacts 230. As is apparent, these contacts are in parallel with the switch 222, and thus when the switch 222 has once been closed and the relay 224 and solenoid 209 have been energized, as when the accelerator is moved to or adjacent its engine idling position above a predetermined speed of the driven shaft 11, the relay 224 and the solenoid 209 will remain energized regardless of a subsequent depression of the accelerator functioning to open the switch 222.

When the valve 200 is in its third speed position with a resultant direct drive through the transmission, and while the relay 224 and solenoid 209 are energized, a downshift from direct drive to second speed drive may be initiated by depressing the accelerator to open throttle position. A movement of the accelerator to this position will open the switch 221 and will break the circuit through the relay winding 223, so that the relay 224 is deenergized and its contacts 230 and 231 open. The opening of the contacts 230 breaks the electric circuit through the solenoid 209, and the spring 207 functions to return the valve 200 to its second speed position, causing a shifting of the transmission back into its second speed condition.

The switch 241, as has been described, is connected in parallel with the switch 221, and the switch 241 is closed above predetermined engine speeds corresponding to predetermined vehicle speeds in direct drive, so that regardless of a depression of the accelerator 240 to open throttle kickdown position opening the switch 221, the transmission remains in direct drive instead of being downshifted. Above predetermined speeds of the vehicle in direct drive, the manifold vacuum increases to actuate the vacuum motor 243 to move the rod 245 to close the switch 241. The circuit for the winding 223 of the relay 224 thus remains completed through the switch 241 and around the switch 221, which may be opened, so as to prevent a downshift above predetermined vehible speeds.

Our improved transmission controls advantageously include the improved form of governor comprising the pivotally mounted weights 179 acting on the pressure regulating valve 170. The governor provides a fluid pressure that varies in accordance with the speed of the driven shaft and which is effective on the shift valve 104 for causing an upshift of the transmission. The accumulator valves 147 and 161 and the metering valves 148 and 162 advantageously function to apply an initial relatively great flow to the forward and reverse conditioning clutches 16 and 17 and subsequently a relatively slow fluid flow for providing a gradual final engagement of the clutches. The regulator valve 71 advantageously has pressure fluid applied within its chamber 103 from the conduit 102 whenever the motor 49 for the brake 19 has fluid pressure applied to it for raising the pressure sufficiently so that slippage of the brake 19 cannot occur in low and reverse drives. The governor valve 170 is advantageously connected with the pump 61 driven by the driven shaft 11, so that no fluid is supplied to the governor valve in reverse drive, whereby there is no shifting movement of the valve 104 in reverse drive. The limit switch 241 actuated by the vacuum motor 243 is advantageously connected in parallel with the switch 221 for limiting a downshift in the second embodiment of the controls to speeds of the vehicle below a predetermined speed.

We wish it to be understood that our invention is not to be limited to the specific constructions and arrangements shown and described, exept only insofar as the claims may be so limited, as it will be apparent to those skilled in the art that changes may be made without departing from the principles of the invention.

We claim:

1. In a transmission, the combination of a drive shaft, a driven shaft, means for providing a low forward drive power train between said shafts, a direct drive between said shafts and a reverse drive between said shafts and including a planetary gear set, a first clutch for conditioning the gear set for a forward drive and a second clutch for conditioning the gear set for reverse drive and also for completing the direct drive when it and said first clutch are engaged, said gear set comprising three elements one of which is connected to drive said driven shaft and the other two of which are respectively connected with said drive shaft by said two clutches, a fluid pressure actuated piston for engaging each of said clutches, a source of fluid pressure, valve means for connecting said pressure source with either or both of said clutches, an accumulator valve connected with each of said pistons for accumulating fluid applied to the respective pistons, said accumulator valves each having a groove therein for initially supplying a relatively large volume of fluid under pressure to the respective piston, each of the accumulator valves moving under the fluid pressure applied to the respective piston for bringing its groove out of communication with the piston on a predetermined fluid pressure being applied to the piston, and a metering valve disposed effectively between said valve means and each of said pistons for providing a metered flow of fluid to the piston after said accumulator valve has so moved, said metering valves each being movable under the influence of fluid under pressure applied to the respective piston whereby the metering valve moves when said valve means is actuated to disapply fluid to said piston to provide a quick drain of fluid from said piston.

2. In a transmission, the combination of a drive shaft, a driven shaft, means for providing forward and reverse drives between the shafts and including a friction clutch for conditioning the transmission for a forward drive and a friction clutch for conditioning the transmission for a reverse drive, a fluid pressure actuated piston for engaging each of said clutches, a source of fluid pressure, valve means for connecting said fluid pressure source with either of said pistons, an accumulator piston connected with each of said clutch pistons for absorbing excessive fluid under pressure applied to the clutch piston and for cushioning engagement of the respective clutch, each of said accumulator pistons having a groove therein which passes an initial relatively large volume of fluid pressure to the clutch piston connected thereto and the accumulator piston on an increase of fluid pressure applied thereto and to the respective clutch piston moving to bring its groove out of communication with the clutch piston, and a metering valve connected with each of said clutch pistons for providing a relatively smaller fluid flow to the respective clutch piston when the corresponding accumulator piston is so moved, said metering valves each being movable when said valve means is actuated to disapply fluid under pressure to the respective clutch piston for allowing a drainage of fluid from the piston around the metering valve in a relatively large volume for quick disapplication of the respective clutch.

3. In a transmission, the combination of a drive shaft, a driven shaft, means for providing low and direct forward drives and a reverse drive between said shafts, a plurality of fluid pressure engaged friction engaging means for completing said drives, a source of fluid pressure, means including a plurality of fluid pressure transmitting lines for selectively connecting said fluid pressure source to said friction engaging means for completing said drives, one of said engaging means being engaged for completing both said low forward drive and said reverse drive, said pressure source including a regulating valve having a pressure surface which functions to increase the fluid pressure of said source, and means connecting the fluid pressure transmitting line for said engaging means which is engaged to complete both said low forward and reverse drives to said pressure surface for supplying fluid under pressure to said pressure surface for said low forward and reverse drives but not for said direct drive, for supplying an increased fluid pressure for the low forward and reverse drives.

4. In a transmission, the combination of a drive shaft, a driven shaft, means for providing low and direct forward drive power trains and a reverse drive power train between said shafts, said means including a planetary gear set and a friction brake for an element of the gear set for providing a reaction for the gear set and completing both the reverse drive power train and the low forward power train, said means also including a friction clutch for completing the direct drive power train, a fluid motor for applying each of said brake and said clutch and including a fluid pressure actuated piston, a source of fluid pressure, means including a plurality of fluid pressure transmitting lines for connecting said source of fluid pressure with said pistons, a regulator valve for said pressure source and having a fluid surface thereon for increasing the pressure of the source, and means for connecting the fluid pressure transmitting line leading to the piston for applying said brake to said regulator valve surface for actuating said regulator valve so as to provide an increased fluid pressure to said brake for the low forward and reverse drive power trains.

5. In transmission mechanism for an automotive vehicle having a driving engine with a fuel intake manifold the vacuum in which varies with engine torque, the combination of a drive shaft, a driven shaft, means for providing relatively low and high speed power trains between said shafts, hydraulically actuated engaging means for completing said power trains, a source of fluid pressure, a shift valve having a low speed position for connecting the respective engaging means with said pressure source for competing said low speed power train and having a high speed position for connecting the respective engaging means with said pressure source for completing the high speed power train in this position, means for providing a pressure tending to move said valve in one direction that varies in accordance with the torque output of the vehicle engine and including a regulating valve connected with said source of fluid pressure and a vacuum motor effective on said last-named valve and connected with the fuel intake manifold of the vehicle engine, and governor means for applying a pressure that varies with driven shaft speed adapted to move the shift valve in the opposite direction and including a regulator valve connected with said pressure source and a plurality of pivotally mounted weights and effective on a thrust rod and rotated in accordance with the speed of said driven shaft, said thrust rod being connected with said last-named regulator valve for applying a force on the valve that varies with the centrifugal force on the weights.

6. In a transmission for an automotive vehicle having a driving engine with a fuel intake manifold the vacuum in which varies with the speed of the engine, the combination of a drive shaft, a driven shaft, means for providing relatively low and high speed ratio power trains between said shafts, an accelerator for the vehicle, means for automatically changing the speed ratio of the transmission from said high speed ratio to said low speed ratio when the accelerator is moved to an open throttle kickdown position and including an electric switch actuated by the accelerator and opened when the accelerator is moved to this position and also including a relay winding connected in series with said switch and normally operable to effect said change from said high speed ratio to said low speed ratio when said switch is opened, and means for preventing a downshift under the control of the accelerator above a predetermined speed of the driven shaft and including a second switch connected in series with said relay winding and in parallel with said first-named switch and a vacuum motor connected with the fuel intake manifold of the vehicle engine and adapted to close said last-named switch above said predetermined speed of the driven shaft for maintaining said relay winding energized.

7. In transmission mechanism, the combination of a drive shaft, a driven shaft, means for providing relatively low and high speed ratio forward drive power trains between said shafts, means for automatically changing the transmission mechanism from the low speed ratio power train to the high speed ratio power train and including a shift valve adapted to have a governor variable force applied to it for moving the valve from a low speed position to a high speed position to cause the change in speed ratio, means including a governor driven by said driven shaft and said last-named means being effective on said valve for shifting the valve, and detent mechanism for yieldably holding said valve in its high speed ratio position and including a tapered portion formed on the valve, a friction element adapted to slide onto said tapered valve portion, and means for maintaining the friction element yieldably in forceful contact with said valve so that it tends to move inwardly of the valve on its tapered valve portion and move the valve to its high speed ratio position and hold it in the latter position.

References Cited in the file of this patent

UNITED STATES PATENTS

| Number | Name | Date |
|---|---|---|
| 2,195,605 | Thompson | Apr. 2, 1940 |
| 2,204,872 | Thompson | June 18, 1940 |
| 2,205,470 | Dunn | June 25, 1940 |
| 2,229,345 | Schotz | Jan. 21, 1941 |
| 2,251,625 | Hale | Aug. 5, 1941 |
| 2,281,916 | Claytor | May 5, 1942 |
| 2,282,949 | Dolza | May 12, 1942 |
| 2,364,774 | Boyce | Dec. 12, 1944 |
| 2,407,289 | La Brie | Sept. 10, 1946 |
| 2,516,203 | Greenlee | July 25, 1950 |
| 2,516,208 | Hasbany | July 25, 1950 |
| 2,575,522 | McFarland | Nov. 20, 1951 |
| 2,599,814 | Cull | June 10, 1952 |
| 2,627,189 | McFarland | Feb. 3, 1953 |